(12) United States Patent
Van Bergen

(10) Patent No.: US 6,647,810 B1
(45) Date of Patent: Nov. 18, 2003

(54) FORCE SENSOR

(76) Inventor: Michael Van Bergen, Franz-Schubert-Str. 27, 51643 Gummersbach (DE)

( * ) Notice: Subject to any disclaimer, the term of this patent is extended or adjusted under 35 U.S.C. 154(b) by 0 days.

(21) Appl. No.: 09/403,365

(22) PCT Filed: Apr. 20, 1998

(86) PCT No.: PCT/EP98/02327
§ 371 (c)(1),
(2), (4) Date: Oct. 20, 1999

(87) PCT Pub. No.: WO98/48254
PCT Pub. Date: Oct. 29, 1998

(30) Foreign Application Priority Data

Apr. 21, 1997 (DE) .......................... 197 16 588

(51) Int. Cl.$^7$ ................................ G01L 5/04
(52) U.S. Cl. ................ 73/862.391; 73/862.392
(58) Field of Search ............... 73/862.391, 862.392, 73/862.68, 862.625, 862.046, 777, 658, 593, 862.043, 862.041, 706, 724, 159, 718; 317/256; 92/100

(56) References Cited

U.S. PATENT DOCUMENTS

| 3,590,694 A | * | 7/1971 | Prescott ........................ 92/100 |
| 3,808,480 A | * | 4/1974 | Johnston ...................... 317/256 |
| 4,295,376 A | * | 10/1981 | Bell ............................. 73/724 |
| 4,562,742 A | * | 1/1986 | Bell ............................. 73/718 |
| 4,970,895 A | * | 11/1990 | Houghton et al. ............. 73/159 |
| 5,225,025 A | * | 7/1993 | Lambing et al. ............. 156/358 |
| 5,249,468 A | * | 10/1993 | Benedikt et al. .............. 73/706 |
| 5,355,714 A | * | 10/1994 | Suzuki et al. ............... 73/146.5 |
| 5,365,799 A | * | 11/1994 | Okada ...................... 73/862.68 |
| 5,407,501 A | * | 4/1995 | Koen et al. ................... 156/64 |
| 5,629,488 A | * | 5/1997 | Kropp ...................... 73/862.68 |

FOREIGN PATENT DOCUMENTS

| DE | 1932899 | 1/1971 |
| DE | 3333285 | 4/1985 |
| DE | 3818191 | 11/1989 |
| DE | 3818190 | 12/1989 |
| DE | 3912280 | 10/1990 |
| DE | 4142141 | 6/1993 |
| DE | 4221426 | 9/1993 |
| DE | 4300995 | 8/1994 |
| EP | 0190270 | 5/1989 |
| FR | 2648559 | 12/1990 |

OTHER PUBLICATIONS

K. Girkmann, Flächentragwerke [Plane Load–Bearing Structures], Springer–Verlag (1963) p. 72.

* cited by examiner

Primary Examiner—Edward Lefkowitz
Assistant Examiner—Octavia Davis
(74) Attorney, Agent, or Firm—Friedrich Kueffner

(57) ABSTRACT

The force sensor according to the invention has a support, a first pressure-sensitive layer, arranged on a first side of the support and connected to a first conductor track, a first force-introduction part with a first contact area which is bounded by edges and is connected to the first pressure-sensitive layer in a first bearing region. A second pressure-sensitive layer, connected to a second conductor track, is arranged on a second side of the support, and a second force-introduction part with a second contact surface bounded by edges is connected to the second pressure-sensitive layer in a second bearing region.

11 Claims, 4 Drawing Sheets

Diagram 1: Force sensor one-sided on 2 mm metal sheet

Diagram 2: Force sensor two-sided on 1.5 mm metal sheet, in a parallel circuit

FORCE SENSOR

Force and pressure sensors can be produced in a particularly adaptable manner in terms of form and inexpensively from piezoresistive, electrical layers using one of the known layer technologies, for example by fusion using thick-film technology, by vapour deposition using thin-film technology, by bonding on, etc. In a series of known-arrangements, such as e.g. in EP 0 190 270 B1 and in DE 38 18 190 A1, provision is made for allowing the forces or pressures to be measured to act directly on the piezoresistive layer, in which case the deformation body which is required for the likewise known force sensors with strain measuring elements is advantageously omitted. However, in the area of industrial force measurement with a mechanically hard force-introduction part predominantly manufactured from steel, none of the arrangements of this type has proved successful heretofore against the competing devices with deformation bodies or with piezoelectric plates, either because the arrangements do not contain a corresponding force-introduction part at all, such as e.g. in DE 43 00 995 A1 and others, or the force-introduction part specified is not envisaged or is not suitable for the said area of application. The reasons for this are found in the special problems which arise when a force-introduction part composed of comparatively hard and tough material such as steel presses on layers which are brittle or tend to cracking under mechanical stress. As revealed by K. Girkmann, Flächentragwerke [Plane load-bearing structures], Springer-Verlag (1963) p. 72 and others, the forces introduced in the layer under the edges of force-introduction parts lead to jumps and/or spikes in the normal and tangential stress distribution which are steeper and/or higher, the more sharp-edged the force-introduction part is and the more the transverse expansion at the force-introduction area is impeded by friction between the force-introduction part and the substrate. In the substrate, compressive stresses occur under the force-introduction part and tensile stresses occur next to the force-introduction part. In order to avoid undesirable stresses, the pressure-sensitive elements can be arranged in the force bypass, as e.g. in DE 33 33 285 A1 and DE 41 42 141 A1, as a result of which, however, the sensitivity of the arrangement is disadvantageously reduced.

The narrow marginal zones in the layers directly under and next to the edges of a force-introduction part, as is described e.g. in DE 39 12 280 A1, at any rate experience considerable mechanical loading which is particularly disadvantageous in the tensile-stress region right next to the edges of the force-introduction part, because the tensile strength of thick-film material is more than a power of ten less than its compressive strength. In the event of continual dynamic loading, the cracking in the layer begins in these marginal zones, and has an adverse effect on the long-term stability of the sensor.

DE 38 18 191 A1 and DE 42 21 426 C1 furthermore disclose force sensors in which the force-introduction part also presses on the regions of the layers which overlap the conductor tracks. Since the layer is electrically connected in parallel with the conductor track in this overlap region, the force component introduced there effects a change in resistance which is not detected, in other words a force bypass that is not concomitantly measured. Moreover, these arrangements have the disadvantage that the transverse expansions (perpendicular to the force direction) occurring in the sensor element on account of the three-dimensional elasticity lead to transverse forces on the conductor tracks and, on the other hand, within the resistive tracks there arise instances of transverse expansion impeding due to the delimiting conductor tracks.

DE 42 21 426 C1 furthermore discloses a variant of a pressure sensor in which the layer covers the conductor tracks and, in addition, a bearing region which is situated between these and is higher than the conductor tracks. The effect achieved by the force-introduction part projecting above the bearing region is that the edges thereof cannot have disturbing or damaging effects on the layer. However, this arrangement has the disadvantage that it is necessary to produce a separate bearing region whose height exceeds that of the conductor tracks to such a distinct extent that in the event of any conceivable loading, the force-introduction part does not end up placed on the conductor tracks. As a result of this, the force-introduction part turns out to be at an increased distance from the support body, which impairs the stability properties of the arrangement.

The invention is based on the object, then, of specifying a force sensor containing a support (4), a pressure-sensitive layer (1a), which is arranged above the support (4) and is connected to a conductor track (3a), a force-introduction part (5a) with a contact area which is bounded by edges and is connected to the layer (1a) in the bearing region (2a), in the case of which force sensor force bypasses, instances of transverse expansion impeding and cracking owing to the effect of edges of the force-introduction parts are precluded as far as possible by means of a suitable construction. Furthermore, the intention is to improve the measurement precision of the force sensor. Finally, the intention is to avoid the sheet-metal bulging and transverse effects that occur with single-sided coating.

This object is achieved by virtue of the fact that a second pressure-sensitive layer (1b), which is connected to a conductor track (3b), is arranged on the support (4), and that a second force-introduction part (5b) is connected to the second pressure-sensitive layer (1b) in the bearing region of a contact area bounded by edges.

Accordingly, the force sensors according to the invention contain a support serving for the construction of the entire element, and also two pressure-sensitive layers which are arranged above the support and are connected to conductor tracks. In this case, if appropriate, further material layers can be arranged between the support and the layers. Furthermore, the force sensors contain force-introduction parts with contact areas which are bounded by edges and are connected to the layers in the bearing region. The force-introduction parts can have virtually any desired form, depending on the requirements of the application. Via their outer areas, the contact areas, they are connected (directly or via intermediate layers) to the pressure-sensitive layers of the support, although the contact takes place only via the inner region of the contact area, that is to say not via the edges. This prevents damage to the pressure-sensitive layer of the support by the edges.

Those surfaces of the layers of the support which face the force-introduction parts may have grooved depressions above which the edges of the contact areas lie in a manner free from contact. In contrast to the prior art, then, it is not necessary to provide a bearing region which is higher than the conductor tracks. Rather, it is possible to arrange pressure-sensitive layers on the support, which layers have a uniform (except for grooves), even height.

Single-layer or multilayer elevated bearing regions and, spaced apart from the latter by interspaces, conductor tracks may also be arranged on the support of the force sensor, conductor tracks, interspaces and bearing regions being covered by the layers in such a way that the grooved depressions are formed above the interspaces. In this case, the bearing regions are preferably formed integrally from the material of the support.

The conductor tracks may also be arranged with their whole area between the support and the pressure-sensitive layers. In the case of an arrangement of this type, the electric current conducted into the layers through the conductor tracks flows orthogonally through the layers, that is to say, as a rule, in the direction of the effect of the compressive force. In this case, at least one of the conductor tracks is preferably formed by the electrically conductive material of the support. In order to compensate for surface irregularities, this is preferably done with the interposition of suitable compensation layers.

The sensor according to the invention therefore involves a "sandwich" design in which two pressure-sensitive layers connected to conductor tracks are arranged on the support, and in which two force-introduction parts are connected to the two pressure-sensitive layers at the inner regions of contact areas bounded by edges. As a rule, the support is designed to be so small that the measuring units arranged on it lie spatially close together.

The mechanical and electrical coupling of two measuring units affords considerable advantages in respect of precision. It is also conceivable to use the "sandwich" design a number of times, so that not just two but a plurality of sensor subunits are coupled to the same intermediate element.

The pressure-sensitive layers on the support may be composed of a material which supplies an electrical signal as a function of the acting pressure. This may be, by way of example, a piezoelectric or piezoresistive material or a semiconductor material. This material is advantageously one which is used as standard in semiconductor fabrication, such as, for example, a disk-seal diode.

Furthermore, the force-introduction parts and/or the support may be provided with an insulating coating. This is the case particularly when the said elements themselves are composed of an electrically conductive material.

For the coating it is possible to use insulating joining materials such as, for example, adhesives with a time-dependent curing process or glass ceramic sheets, so-called "ceramic tapes", in order that the entire sensor arrangement can advantageously be pressed on one another in a plane-parallel manner before the curing or firing.

Likewise insulating joining materials, for example adhesives with a time-dependent curing process or glass ceramic sheets (so-called "ceramic tapes"), can be used as materials for the support. In this case, too, the entire sensor arrangement can advantageously be pressed on one another in a plane-parallel manner before the curing or firing.

Exemplary embodiments of the invention are illustrated in the drawings.

FIG. 1 shows a force sensor with pressure-sensitive layer 1$a$, $b$, bearing regions 2$a$, $b$, conductor tracks 3$a$, $b$, support—so-called substrate—4 and force-introduction parts 5$a$, $b$, and also insulating layers 7$a$, $b$ for the case where substrate and force-introduction parts are composed of conductive material such as, for example, steel.

Figure 2:
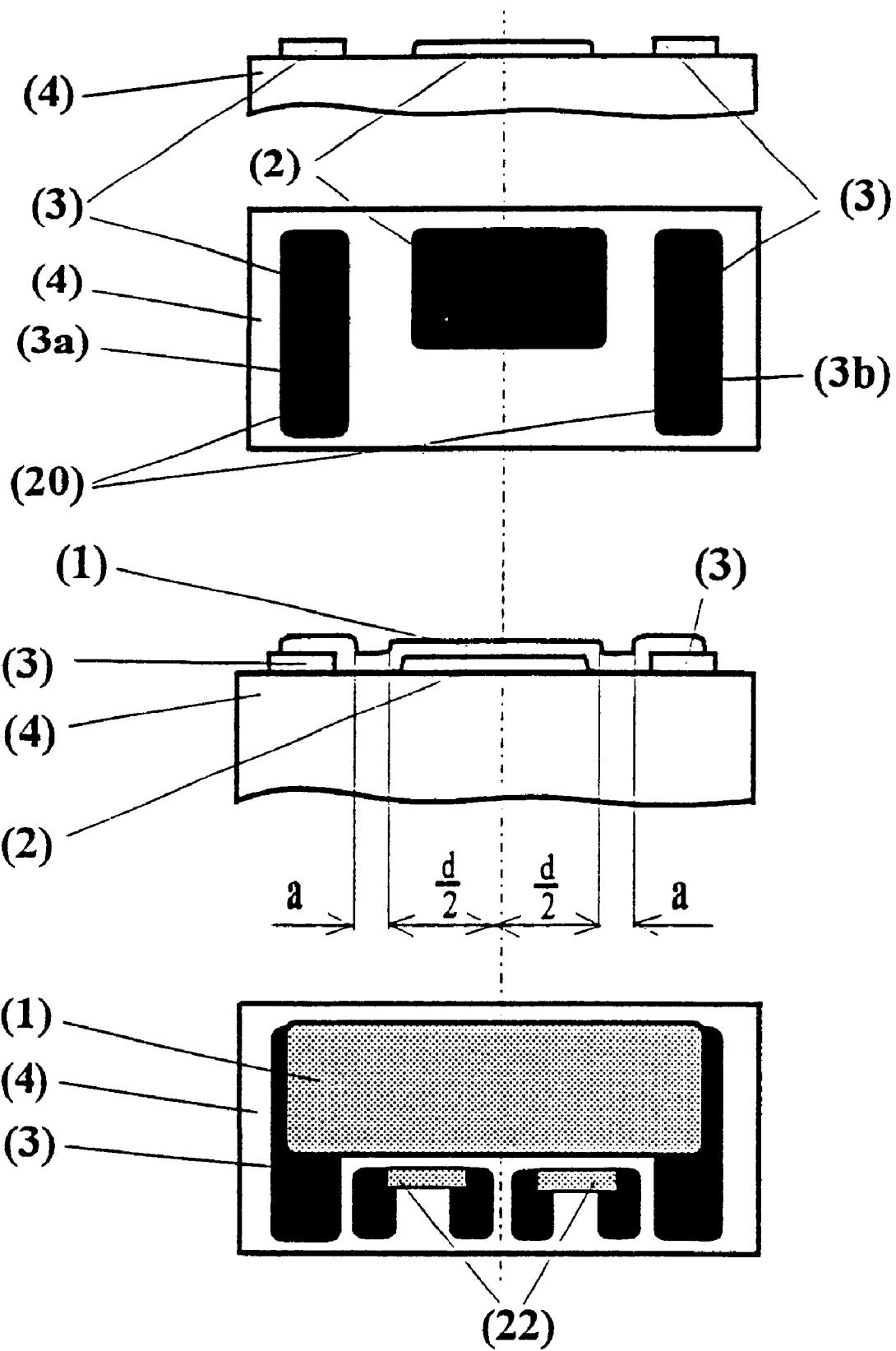
FIG. 2 shows two intermediate stages in the production of the force sensor.

FIG. 2 shows the arrangement of conductor tracks 3 with the soldering contact areas 8 on the conductor-track ends and bearing region 2 on the support 4 and also the layer sequence with pressure-sensitive layer 1 over the bearing region 2 and overlapping on the conductor tracks 3, and furthermore the possible additional application of electrical components such as, for example, comparison resistors without a bearing region 2 on the support 4.

The planar support 4 is composed either entirely of electrically insulating material, for example $Al_2O_3$, or of a support that has been precoated with electrically insulating material 7$b$. First of all, the bearing regions 2 and the conductor tracks 3 are applied to this support, as illustrated in FIG. 2. The conductor tracks serve for connecting the sensor with the conductor-track ends via soldering points 8 by cable connection to the external measuring circuit. As shown by FIG. 2, the piezoresistive, pressure-sensitive layer 1 is then applied to the support 4 with conductor tracks 3 and bearing region 2, to be precise in such a way that contact with the conductor tracks 3 is produced as a result of an overlapping arrangement with the said conductor tracks.

FIG. 1 shows how ultimately the force-introduction parts 5$a$, $b$ press on the piezoresistive layers with forces F and G, which are indicated by arrows. If the force-introduction parts 5$a$, $b$ are not composed of electrically insulating material, they must be precoated beforehand with electrically insulating material, since otherwise they would electrically bridge the pressure-sensitive layers 1$a$, $b$.

To ensure that the edges of the force-introduction parts 5$a$, $b$ in accordance with FIG. 1$a$ are exposed, the force-introduction parts, with a central position, must always be smaller, in terms of their dimension c, than d+2a (d=width of the contact-connected layer; a=width of the depression groove), in order that they do not burst on the overlapped conductor tracks 3$a$, $b$. In the case of all coating processes, the applied pressure-sensitive layers 1$a$, $b$ should run plane-parallel to the support 4 in the region d of the action of the force, which, depending on the coating process, is achieved by pressing with the aid of the force-introduction plate or a processing plate as long as the pressure-sensitive layers 1$a$, $b$ are not yet cured or fired.

In a and b, FIG. 1 shows two embodiments with a sensor arrangement applied in a mirror-inverted fashion on two sides on the top side and underside of a support 4.

If metal sheets are used for the supports 4, the desired effect of compression on account of orthogonal compressive force in the piezoresistive material can be superposed by transverse effects on account of bending back of the sheet-metal bulges. Bulges are produced for example in the course of cooling after one-sided application of the proposed coating owing to the different expansion coefficients between metal sheet and coating material. Other causes of instances of sheet-metal warpage which are present independently of the coating occur for example in rolled metal sheets on account of the rolling operation and are dependent inter alia on the rolling direction.

Figure 4:
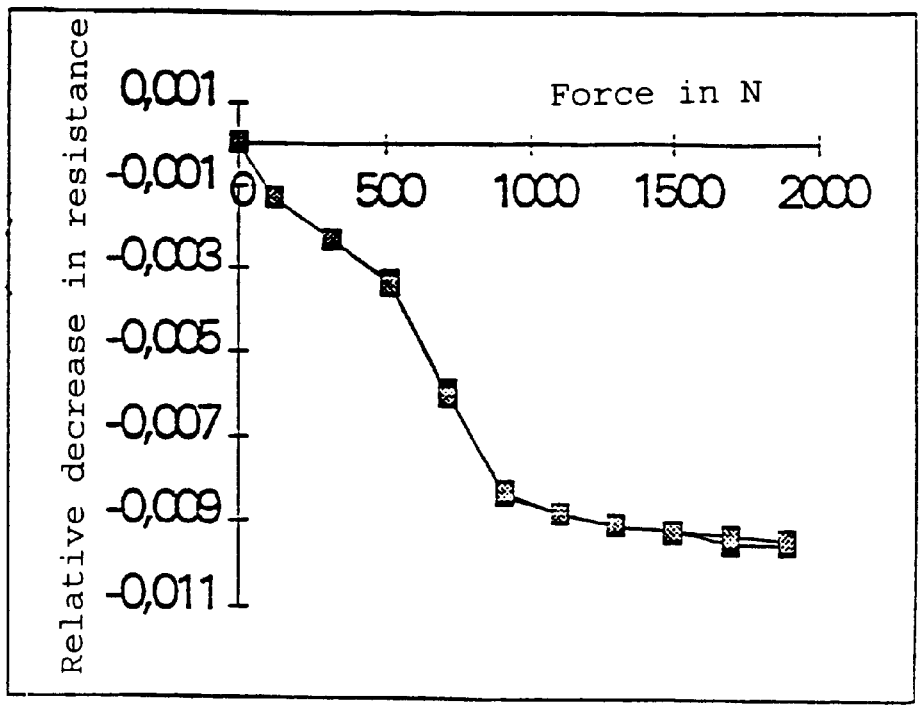
FIG. 4 shows comparison measurements of one/two-sided sensors.
Figure 4:
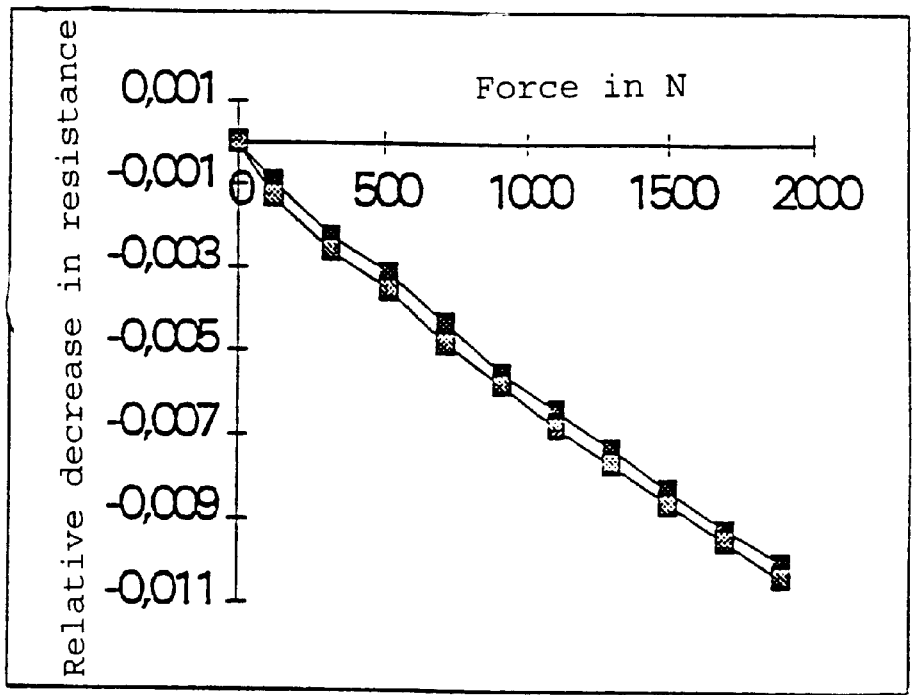

If the force is introduced into a sensor having a one-sided coating on a support via force-introduction parts, then the sheet-metal bulging first of all recedes. In this case, additional compressions or expansions are produced in the layers on the top side or underside of the supports. Consequently, in the event of a force which increases from zero, first of all a large change in resistance can be detected in the piezoresistive material, which change varies greatly and depends on rolling direction and the different expansion coefficients of metal sheet and ceramic (diagram 1 in FIG. 4; horizontal axis=force [N], vertical axis=relative change in resistance; one-sided force sensor on 2 mm metal sheet).

With an increasing force, the purely orthogonal effect predominates and the sensitivity declines. This embodiment of the sensor is highly unfavourable owing to the severe nonlinearity and poor reproducibility.

With the support 4, which, according to FIG. 1 has been coated on the top side and underside in each case with the same, mirror-inverted, sensor structure, the additional sheet-metal warpage occurring in the case of one-sided coating can no longer be observed. Furthermore, the changes in resistance which are produced by the bending back of further instances of warpage which have other causes can be eliminated in that a sensor on the top side is connected in series or in parallel with a sensor arranged in a mirror-inverted fashion on the underside. Sensors which are constructed and connected up in this way no longer exhibit the transverse effects described above (diagram 2 in FIG. 4; two-sided force sensor on 1.5 mm metal sheet).

Adhering to a sufficient distance a such that a cannot become zero even under maximum load ensures that instances of transverse expansion impeding are largely prevented.

Figure 1A:
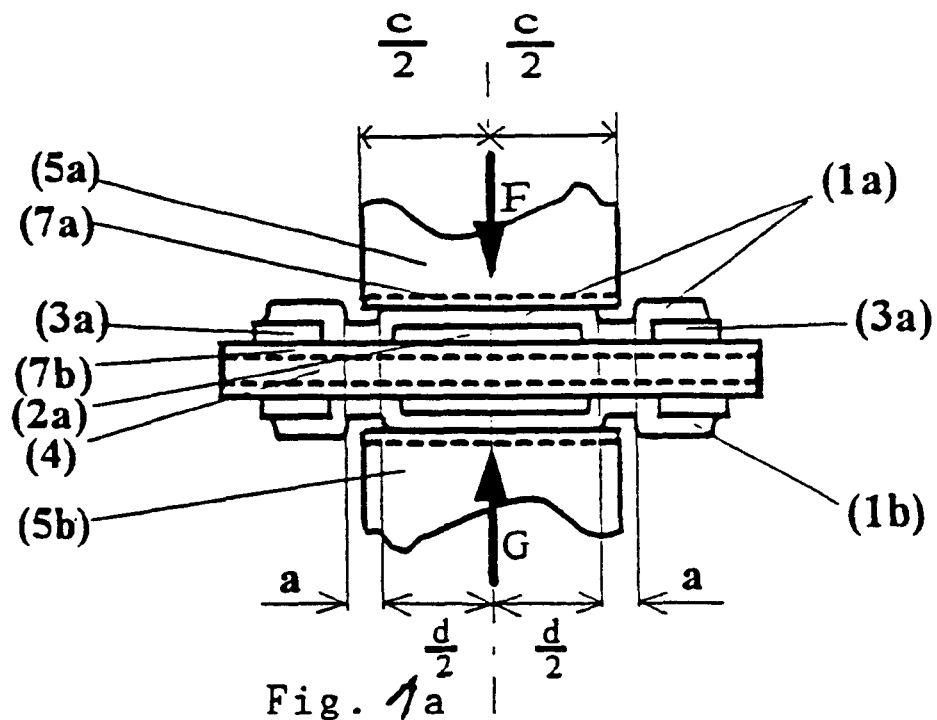
FIG. 1 shows the "sandwich" design with a central support.
Figure 1B:
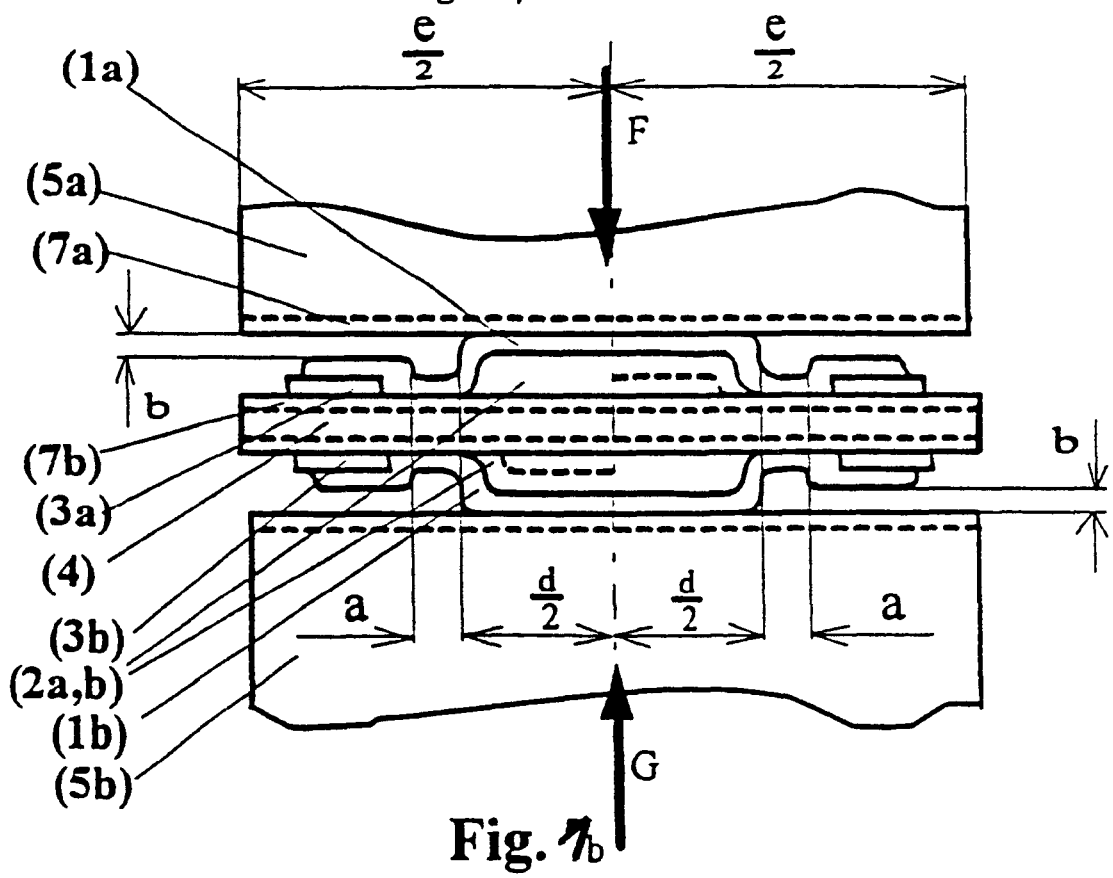

The effect of the edges of the force-introduction parts 5a, b on the pressure-sensitive layers 1a, b in accordance with FIG. 1b is avoided by a central position and suitable longitudinal dimensions of the force-introduction parts, whose lengths c, even under maximum load, are greater than the length d of the elevated region of the piezoresistive pressure-sensitive layers 1a, b, which also applies analogously to the depth dimensions.

In order to avoid force bypasses via the regions of the pressure-sensitive layers 1a, b which overlap the conductor tracks 3a, b the lengths c, in accordance with FIG. 1a are always smaller than d+2a. This limitation is, of course, also necessary analogously for the depth dimension.

Adhering to a sufficiently large distance b in accordance with FIG. 1b, which must not become zero even under maximum load, ensures that a force bypass via those regions of the conductor tracks which are overlapped by layers is not possible.

In principle, in all embodiments the bearing regions 2a, b may be composed of single- or multilayer electrically insulating material. They may also be composed, in one or a plurality of layers, of the same piezoelectric resistive material as the pressure-sensitive layers 1a, b. The double-printing of resistors is a customary method in thick-film technology, for example. In the last case, the pressure-sensitive layers 1a, b and bearing regions 2a, b are electrically connected in parallel, with the result that their total resistance is smaller than the resistance of the pressure-sensitive layers 1a, b alone.

Figure 3:
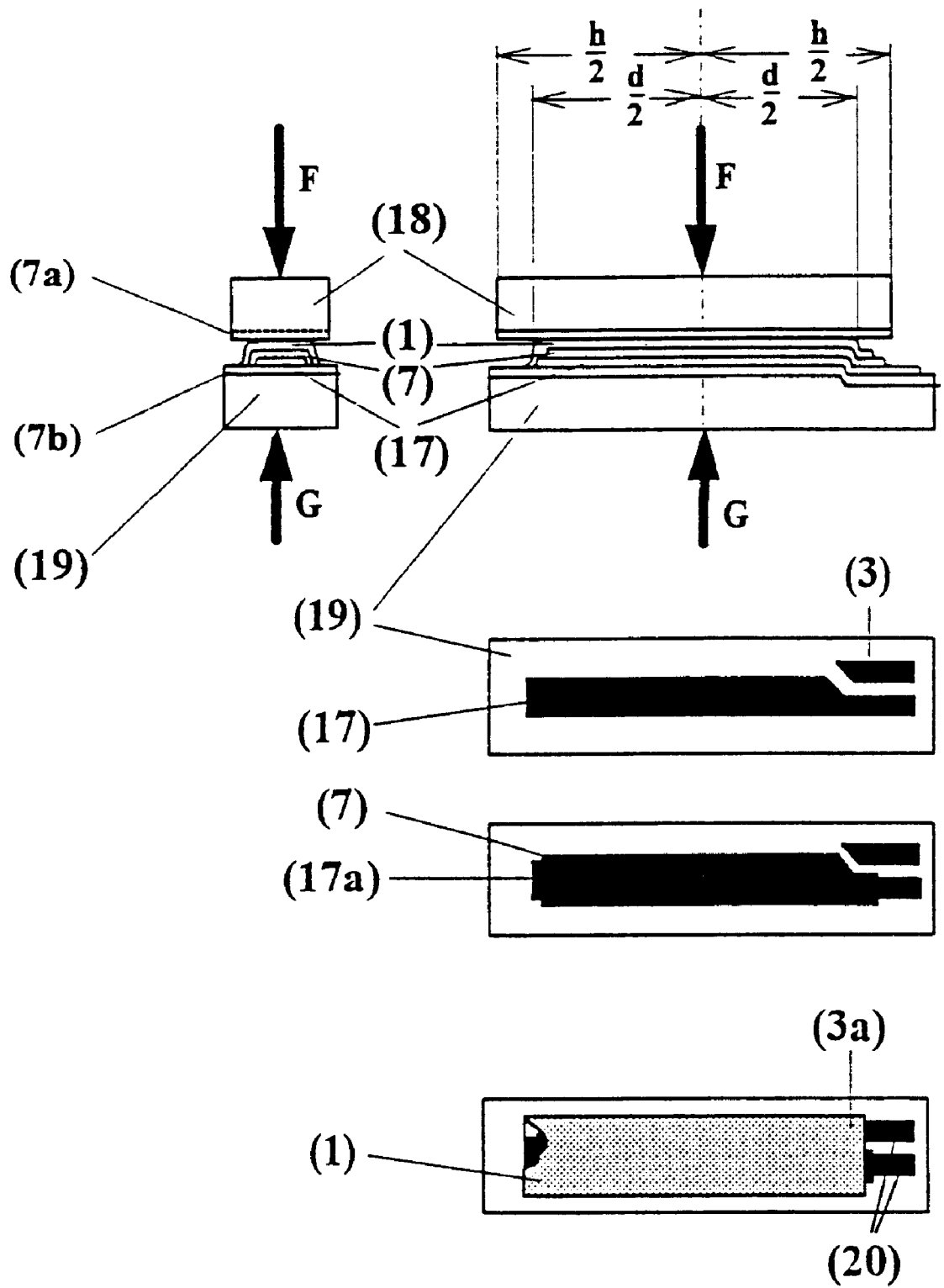
FIG. 3 shows a sensor element with a conductor track laid under it.

Finally, the bearing regions 2a, b may alternatively be composed of two or more layers of different material, for example of one or more conductor track(s) and one or more insulating layer(s) placed over the latter. That has the advantage that the conductor track(s) laid underneath simultaneously serve, in a space-saving manner, as a connecting line for the sensor, as shown by the exemplary embodiment in FIG. 3. The conductor track 3a, which passes as a lead to the spatially further away connection of the pressure-sensitive layer 1, is laid under an insulating layer 7 in this case. If, after coating, the pressure-sensitive layer 1 covers the free contact area, the electrical through-connection to the conductor track 3 is established. In this way, it is advantageously possible to produce sensor elements with the two electrical connection contacts 8 on one end, which is particularly favourable for matrix arrangements.

List of reference symbols:
1a, b pressure-sensitive layers
2a, b bearing regions
3a, b conductor tracks
4 supports
5a, b force-introduction parts
7a, b insulating layers
8 soldering points
9 comparison resistors
a width of the depression groove
b distance between layer above conductor track and force-introduction parts
c, e, h diameters of the force-introduction part
d contact width with respect to the layer
f force
g counterforce

What is claimed is:

1. A force sensor, containing
   a) a support (4),
   b) a first pressure-sensitive layer (1a), which is arranged on a first side of the support (4) and is connected to a first conductor track (3a),
   c) a first force-introduction part (5a) with a first contact area which is bounded by edges and is directly connected to the first pressure-sensitive layer (1a) in a first bearing region (2a),
      wherein a second pressure-sensitive layer (1b), which is connected to a second conductor track (3b), is arranged on a second side of the support (4) opposite the first side of the support (4), and a second force-introduction part (5b) with a second contact surface bounded by edges is directly connected to the second pressure-sensitive layer (1b) in a second bearing region (2b), wherein the pressure-sensitive layers (1a, b) are composed of a piezoelectric, piezoresistive material or a semiconductor material.

2. The force sensor according to claim 1, wherein surfaces of the pressure-sensitive layers (1a, b) which face the force-introduction parts (5a, b) have grooved depressions above which the edges of the contact areas lie free from contact.

3. The force sensor according to claim 1, wherein the bearing regions are single-layer or multilayer elevated bearing regions (2a, b) and, spaced apart from the bearing regions by interspaces, the conductor tracks (3a, b) are arranged on the support (4), the conductor tracks (3a, b), the interspaces and the bearing regions (2a, b) being covered by the layers (1a, b) in such a way that the grooved depressions are formed above the interspaces.

4. The force sensor according to claim 3, wherein the bearing regions (2a, b) are formed integrally from a material of the support (4).

5. The force sensor according to claim 1, wherein the conductor tracks (3a, b) have their whole areas situated between the pressure-sensitive layers (1a, b) and the support (4).

6. The force sensor according to claim 1, wherein at least one of the conductor tracks (3a, b) is formed by the electrically conductive material of the force-introduction parts (5a, b) or of the support (4).

7. The force sensor according to claim 1, wherein it is constructed symmetrically with respect to a plane passing through the support (4).

8. The force sensor according to claim 1, wherein at least one of the force-introduction parts (5a, b) and the support (4) are provided with insulating layers (7a, b).

9. The force sensor according to claim 8, wherein insulating joining materials, preferably adhesives with a time-dependent curing process or glass ceramic sheets, are used for the insulating layers (7*a, b*).

10. The force sensor according to claim 1, wherein the force-introduction parts (5*a, b*) contain insulating joining materials, preferably adhesives with a time-dependent curing process or glass ceramic sheets.

11. The force sensor according to claim 1, wherein the support (4) contains insulating joining materials, preferably adhesives with a time-dependent curing process or glass ceramic sheets.

* * * * *